US009556047B2

(12) United States Patent
Hoefken

(10) Patent No.: US 9,556,047 B2
(45) Date of Patent: Jan. 31, 2017

(54) DEVICE FOR GASSING LIQUIDS

(75) Inventor: Marcus Hoefken, Erlangen (DE)

(73) Assignee: INVENT UMWELT-UND VERFAHRENSTECHNIK AG, Erlangen (DE)

( * ) Notice: Subject to any disclaimer, the term of this patent is extended or adjusted under 35 U.S.C. 154(b) by 329 days.

(21) Appl. No.: 13/637,267

(22) PCT Filed: Jun. 6, 2011

(86) PCT No.: PCT/EP2011/059290
§ 371 (c)(1),
(2), (4) Date: Dec. 18, 2012

(87) PCT Pub. No.: WO2011/154354
PCT Pub. Date: Dec. 15, 2011

(65) Prior Publication Data
US 2013/0093106 A1    Apr. 18, 2013

(30) Foreign Application Priority Data

Jun. 7, 2010   (DE) .................. 10 2010 029 754

(51) Int. Cl.
C02F 3/20      (2006.01)
B01F 3/04      (2006.01)
(52) U.S. Cl.
CPC .............. *C02F 3/201* (2013.01); *B01F 3/0412* (2013.01); *B01F 3/04255* (2013.01);
(Continued)
(58) Field of Classification Search
CPC ... C02F 3/201; B01F 3/04255; B01F 3/04269; B01F 3/0412; B01F 2003/04276; B01F 2003/04297; B01F 2003/04177; Y02W 10/15
(Continued)

(56) References Cited

U.S. PATENT DOCUMENTS 3,334,819 A * 8/1967 Olavson .............. B01F 3/04255
                                                    222/542
3,608,834 A * 9/1971 MacLaren .......... B01F 3/04255
                                                    137/516.17
(Continued)

FOREIGN PATENT DOCUMENTS

CH       EP 0549518 A1 *  6/1993  .......... B01F 3/04269
CH       WO 03011442 A1 *  2/2003  .......... B01F 3/04269
(Continued)

OTHER PUBLICATIONS

DE 102 51 494 published Apr. 2002 Translation.*
(Continued)

*Primary Examiner* — Duane Smith
*Assistant Examiner* — Stephen Hobson
(74) *Attorney, Agent, or Firm* — Manabu Kanesaka

(57) ABSTRACT

A device for gassing liquids, in particular for aerating sewage and the like, includes a lower housing element, which has a substantially round opening area and a gas inlet port, a disc-shaped upper housing element, corresponding to the opening area, for covering the opening area, the upper housing element having an upper side facing away from the lower housing element, a number of gas through-openings provided in the vicinity of a peripheral edge of the upper housing element, passing through the upper side, and a perforated gassing membrane, covering over the upper side of the upper housing element.

16 Claims, 3 Drawing Sheets

(52) U.S. Cl.
CPC ...... *B01F 3/04269* (2013.01); *B01F 2003/04177* (2013.01); *B01F 2003/04276* (2013.01); *B01F 2003/04297* (2013.01); *Y02W 10/15* (2015.05)

(58) Field of Classification Search
USPC ....................................................... 261/122.1
See application file for complete search history.

(56) References Cited

U.S. PATENT DOCUMENTS

| | | | | |
|---|---|---|---|---|
| 3,790,142 A * | 2/1974 | Goodman | ........... | B01F 3/04255 261/124 |
| 3,997,634 A * | 12/1976 | Downs | ........... | B01F 3/0412 239/533.14 |
| 4,007,240 A * | 2/1977 | Gosden | ........... | B01F 3/0412 210/220 |
| 4,288,394 A * | 9/1981 | Ewing | ........... | B01F 3/04262 137/852 |
| 4,382,867 A * | 5/1983 | Schmit et al. | ........... | B01F 3/0412 134/170 |
| 4,569,805 A * | 2/1986 | Hume | ........... | B01F 3/04262 261/122.1 |
| 4,597,530 A * | 7/1986 | Goudy, Jr. | ........... | B01F 3/04269 239/452 |
| 4,631,134 A * | 12/1986 | Schussler | ........... | B01F 3/04269 210/220 |
| 4,639,314 A * | 1/1987 | Tyer | ........... | B01F 3/04262 210/220 |
| 4,764,314 A * | 8/1988 | Schneider | ........... | B01F 3/04269 137/854 |
| RE33,177 E * | 3/1990 | Schmit | ........... | B01F 3/0412 134/170 |
| 5,093,047 A * | 3/1992 | Zeppenfeld | ........... | B01F 3/04269 137/859 |
| RE33,899 E * | 4/1992 | Tyer | ........... | B01F 3/04262 210/220 |
| 5,133,862 A * | 7/1992 | Cannan | ........... | B01F 3/04269 210/321.75 |
| 5,330,688 A * | 7/1994 | Downs | ........... | B01F 3/0412 261/122.1 |
| 5,378,355 A * | 1/1995 | Winkler | ........... | C02F 3/20 134/171 |
| 5,458,771 A * | 10/1995 | Todd | ........... | B01F 3/04269 119/263 |
| D371,187 S * | 6/1996 | Ryynanen | ........... | D23/210 |
| 5,858,283 A * | 1/1999 | Burris | ........... | B01F 3/04269 156/290 |
| 6,344,147 B1 * | 2/2002 | Meyer | ........... | B03D 1/14 210/221.2 |
| 6,390,456 B1 * | 5/2002 | Lee | ........... | B01F 3/0412 210/242.2 |
| 6,464,211 B1 * | 10/2002 | Downs | ........... | B01F 3/04241 261/122.1 |
| 7,243,912 B2 * | 7/2007 | Petit | ........... | B01F 3/04269 261/122.2 |
| 7,311,299 B2 * | 12/2007 | Sasajima | ........... | C02F 3/201 261/122.1 |
| 8,002,249 B2 * | 8/2011 | Casper | ........... | B01F 3/0412 261/122.1 |
| 8,603,805 B2 * | 12/2013 | Goodwin | ........... | B01F 3/04269 261/122.1 |
| 2002/0041041 A1 * | 4/2002 | Johnson | ........... | B01F 3/04262 261/122.1 |
| 2003/0192817 A1 | 10/2003 | Frankel | | |
| 2004/0124550 A1 * | 7/2004 | Casper | ........... | B01F 3/0412 261/122.1 |
| 2009/0166901 A1 * | 7/2009 | Tharp | ........... | B01F 3/0412 261/122.1 |
| 2010/0133709 A1 * | 6/2010 | Hu | ........... | B01F 3/04269 261/122.2 |
| 2010/0213624 A1 * | 8/2010 | Madsen | ........... | B01F 3/04262 261/93 |
| 2011/0132847 A1 * | 6/2011 | Smiltneek | ........... | B01F 3/0412 210/758 |
| 2011/0304063 A1 * | 12/2011 | Ko | ........... | B01F 3/04262 261/77 |
| 2012/0267305 A1 * | 10/2012 | Hoefken | ........... | C02F 3/085 210/616 |
| 2015/0246835 A1 * | 9/2015 | Ko | ........... | C02F 3/201 210/151 |

FOREIGN PATENT DOCUMENTS

| | | | | |
|---|---|---|---|---|
| DE | 3716805 A1 * | 12/1988 | ........... | B01F 3/04269 |
| DE | 39 21 937 A1 * | 1/1991 | ........... | B01F 3/0412 |
| DE | 3921936 A1 * | 1/1991 | ........... | B01F 3/0412 |
| DE | 4206136 A1 * | 9/1992 | ........... | B01F 3/04269 |
| DE | 9318675 U1 * | 3/1994 | ........... | B01F 3/04269 |
| DE | FR 2698797 A1 * | 6/1994 | ........... | B01F 3/04978 |
| DE | 9415775 U1 * | 12/1994 | ........... | B01F 3/0412 |
| DE | G 94 15 775 U1 | 1/1995 | | |
| DE | EP 0704237 A2 * | 4/1996 | ........... | B01F 3/0412 |
| DE | 102 51 494 | * 4/2002 | | |
| DE | 10251494 | * 4/2002 | | |
| DE | 10251494 A1 * | 7/2003 | ........... | B01F 3/04255 |
| EP | 0418652 A1 * | 3/1991 | ........... | B01F 3/04269 |
| EP | 0 549 518 | 6/1993 | | |
| EP | 0549518 | * 8/1995 | | |
| EP | 0 940 371 | 9/1999 | | |
| EP | 2 110 170 | 10/2009 | | |
| GB | 712170 A * | 7/1954 | ........... | B01F 3/04269 |
| GB | 824376 A * | 11/1959 | ........... | B01F 3/0412 |
| GB | 1304147 A * | 1/1973 | ........... | B01F 3/04269 |
| JP | 2004-216299 A | 8/2004 | | |
| JP | 2007-038198 A | 2/2007 | | |
| JP | 2007-307439 A | 11/2007 | | |
| JP | 2003-300090 | * 3/2008 | | |
| JP | 4056281 B2 * | 3/2008 | | |
| JP | WO 2012108008 A1 * | 8/2012 | ........... | C02F 3/201 |
| JP | 5270033 B1 * | 8/2013 | ........... | B01F 3/04269 |
| KR | 20110042024 A * | 4/2011 | ........... | B01F 3/04269 |

OTHER PUBLICATIONS

EP 0549518 B1 published Aug. 23, 1995 as translated by Google.*
Japan Patent Office, "Office Action for JP 2013-513648," Apr. 1, 2015.

* cited by examiner

DEVICE FOR GASSING LIQUIDS

RELATED APPLICATIONS

The present application is National Phase of International Application No. PCT/EP2011/059290 filed Jun. 6, 2011, and claims priority from German Application No. 10 2010 029 754.2, filed Jun. 7, 2010.

The invention relates to a device for gassing liquids, in particular for aerating sewage and the like.

EP 0 549 518 A1 describes a device for fine-bubble gassing of a liquid. Here, a support plate comprises at least one gas outlet opening. A gassing membrane with a fine perforation is tightly connected in the edge region with the support plate. Furthermore, an opening of the gas outlet opening is provided with a one-way membrane valve which prevents liquid from penetrating into the gas outlet opening. For gassing a liquid, for example, air is pressed through the gas outlet opening and between the support plate and the gassing membrane. As a result, the gassing membrane is lifted from the support plate and forms a convex surface toward the outside. The air passes through the perforation and forms fine air bubbles in the liquid to be gassed. —If a high water pressure of, for example, 4 to 8 meter water column acts on said known device, the gassing membrane is lifted from the support plate only in the region of the gas outlet opening located therebelow. Gas outlet takes place only in this limited region. The effectiveness of the known device is greatly limited in particular in the case of high water pressure.

From DE 94 15 775 U1, another gassing device is known. Here, two radial slots are provided as gas outlet openings in a plate-like support structure. A gassing membrane has no perforation in the region above the gas outlet openings. — This increases the effectiveness of the gassing device in the case of high water pressure. Nevertheless, here too, the regions of the gassing membrane located remote from the gas outlet opening are pressed by the water pressure against the support structure. Disadvantageously, no gas passes in these regions through the perforation of the gassing membrane and into the liquid to be gassed.

It is an object of the invention to eliminate the disadvantages according to the prior art. In particular, a device is to be proposed which enables effective gassing of a liquid even at high liquid pressure. According to another object of the invention, the device shall be as robust and reliable as possible.

This object is achieved by the features of the claim 1. Expedient embodiments of the invention derive from the features of the claims 2 to 13.

In accordance with the invention, a device for gassing liquids, in particular for aerating sewage and the like, is proposed, comprising a lower housing element which has a substantially round opening area and a gas inlet port, a disk-shaped upper housing element, which corresponds to the opening area, for covering the opening area, wherein the upper housing element has an upper side facing away from the lower housing element, and wherein a plurality of gas through-openings is provided in the vicinity of a peripheral edge of the upper housing element, said gas through-openings passing through the upper side, and a perforated gassing membrane covering the upper side of the upper housing element.

The upper housing element is substantially formed from a disc-shaped carrier plate, the upper side of which is covered by the perforated gassing membrane. The perforated gassing membrane expediently engages around a peripheral edge of the carrier plate. By providing the gas through-openings in the vicinity of the peripheral edge, it is ensured even at high water pressure that the gassing membrane completely lifts off from the upper side of the carrier plate, and gas passes through the perforations of the gassing membrane. Furthermore, the proposed device has the advantage that already at a relatively low air pressure, air bubbles escape through the gassing membrane. With regard to the quantity of air to be used for gassing, the device can be controlled within a wide range. In a lower control range, the device can already be operated with a small quantity of air.

The term "in the vicinity of the peripheral edge of the upper housing element" is to be understood as an annular area on the upper side which extends from the peripheral edge up to approximately the 0.5-fold, preferably the 0.7-fold, of a radius of the upper housing element. Advantageously, the gas through-openings can be formed as slots which are arranged at the same radial distance from a center point of the upper housing element and extend in sections along an imaginary circle which lies inside the annular area.

According to an advantageous embodiment of the invention, the lower housing element has a bottom which, at least in sections, is configured in a funnel-like manner and on which a connecting piece shaped in the manner of a fillet is molded for positively attaching the lower housing element to a gas supply line. Expediently, the connecting piece is configured in the manner of a semi-cylindrical chute, at the two edges of which outwardly projecting webs can be formed. Further, a counter piece corresponding to the connecting piece can be provided which has substantially the shape of a chute, at the edges of which opposing groove-like recesses are formed. This enables to substantially positively attach the connecting piece to a gas supply line and to interlock the same with the counter piece. For establishing a nonpositive connection, for example, said webs and the groove-like recesses corresponding thereto can be arranged obliquely so that with increasing insertion depth of the webs into the groove-like recesses, an increasing elastic force acts which forces the connecting piece and the counter piece against the gas supply line.

The bottom can comprise a curved section with a curvature that corresponds to the fillet and protrudes toward the opening area. Expediently, the gas inlet port passes centrally through the bottom. Furthermore, the gas inlet port expediently passes through the connecting piece. Thus, by attaching the lower housing element, the gas inlet port can be immediately connected to a gas supply opening in the gas supply line. This simplifies assembling the device according to the invention on the gas supply line.

According to another embodiment of the invention, a gas inlet port opening facing the housing interior of the lower housing element is provided with a one-way valve, preferably a one-way membrane valve. In particular, a one-way membrane valve can be produced in a simple and cost-effective manner. For example, in the case of damage to the gassing membrane, providing a one-way valve prevents liquid from penetrating into the gas inlet port.

According to a further embodiment, it is provided that a cylindrical support structure extends from a lower side of the upper housing element which lower side opposes the upper side. The cylindrical support structure, which is advantageously attached centrally on the lower side, advantageously comprises a plurality of apertures which enable gas to penetrate into the housing interior. Expediently, the apertures are configured in the form of axially extending slots.

From the cylindrical support structure, webs or ribs can extend radially toward the peripheral edge. Such ribs which, expediently, are molded on the lower side of the support plate, increase stability of the device. In particular, undesired deformation of the carrier plate due to the influence of high water pressure is avoided.

Between two adjacent ribs, in each case one gas outlet opening can be provided. Expediently, the gas outlet opening is slot-shaped and extends in the carrier plate adjacent to the peripheral edge from a rib up to the next adjacent rib.

According to a further particularly advantageous embodiment of the invention, the ribs are configured such that they are positively supported in sections on the curved section when the upper housing element is attached on the lower housing element. Thus, the stability of the carrier plate against the action of high water pressure can be further improved.

According to a further particularly advantageous embodiment of the invention, the ribs are configured such that when the upper housing element is attached on the lower housing element, they can be positively supported on the curved section in two directions perpendicular to each other. This means, a lower edge of the ribs is configured in such a manner that the upper housing element can be positively attached in two assembly positions onto the lower housing element, in particular onto the curved section of the bottom. This further facilitates assembling the device.

According to a further embodiment, a threaded ring engaging over the edge of the upper housing element is provided for fastening the upper housing element to the lower housing element. With the proposed threaded ring, the upper housing element is forced against the lower housing element. The proposed connection of the housing elements by means of the threaded ring is detachable. Accordingly, for example, a defective gassing membrane can be replaced.

An exemplary embodiment of the invention is illustrated in more detail hereinafter by means of the drawings. In the figures.

Figure 1:
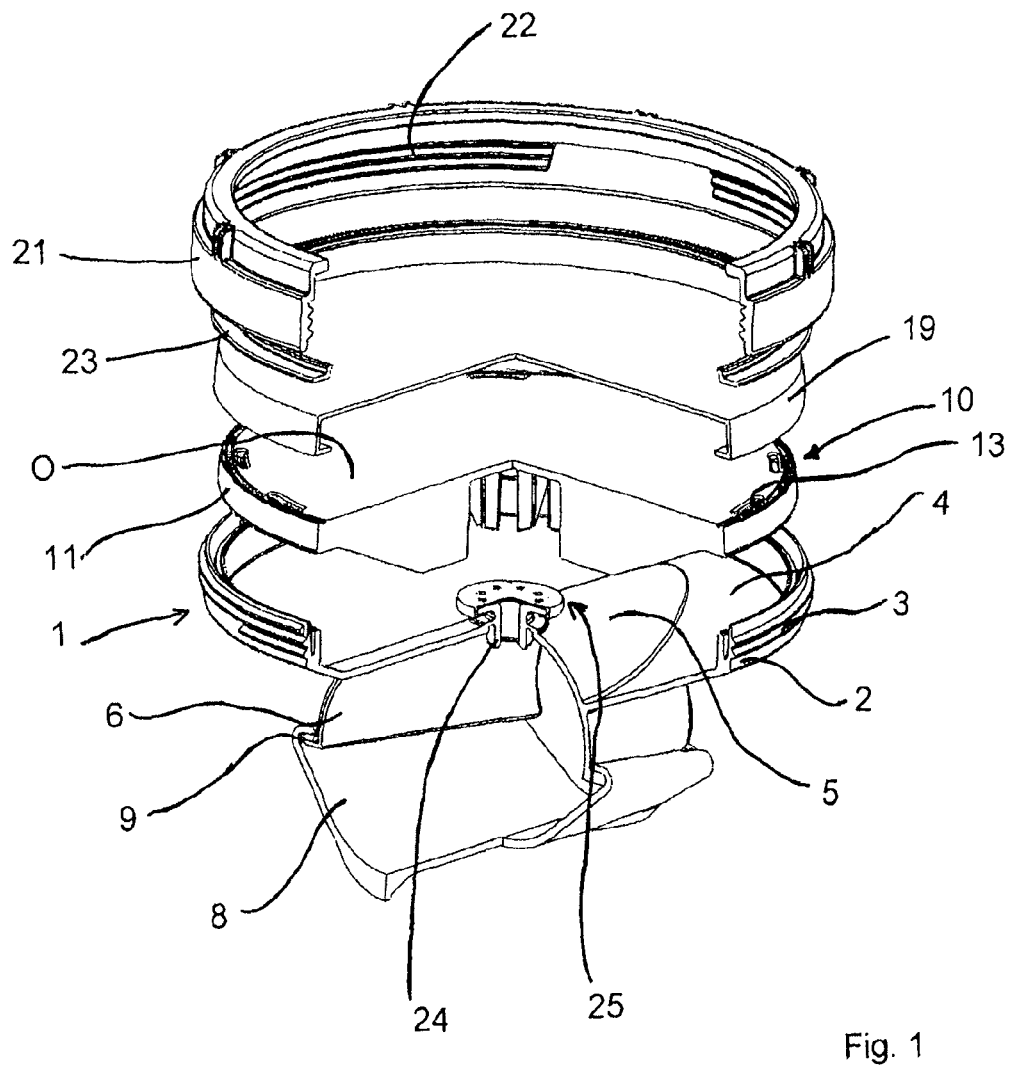
FIG. 1 shows a partially cut-open exploded view of a device.
Figure 2:
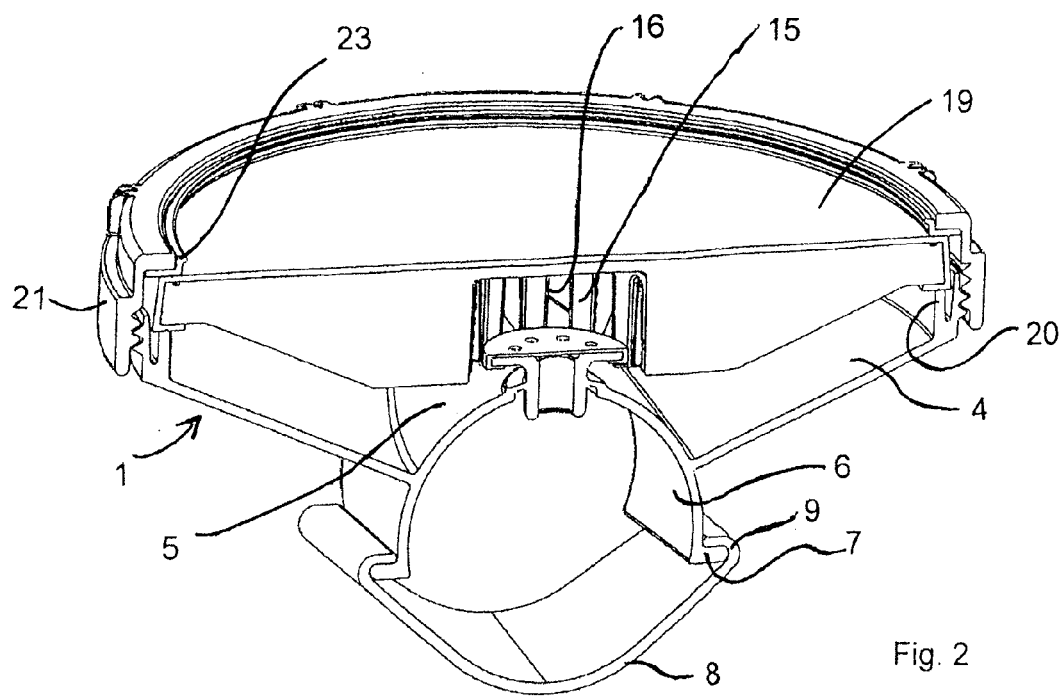
FIG. 2 shows a perspective sectional view through the device according to FIG. 1, in the assembled state.
Figure 3:
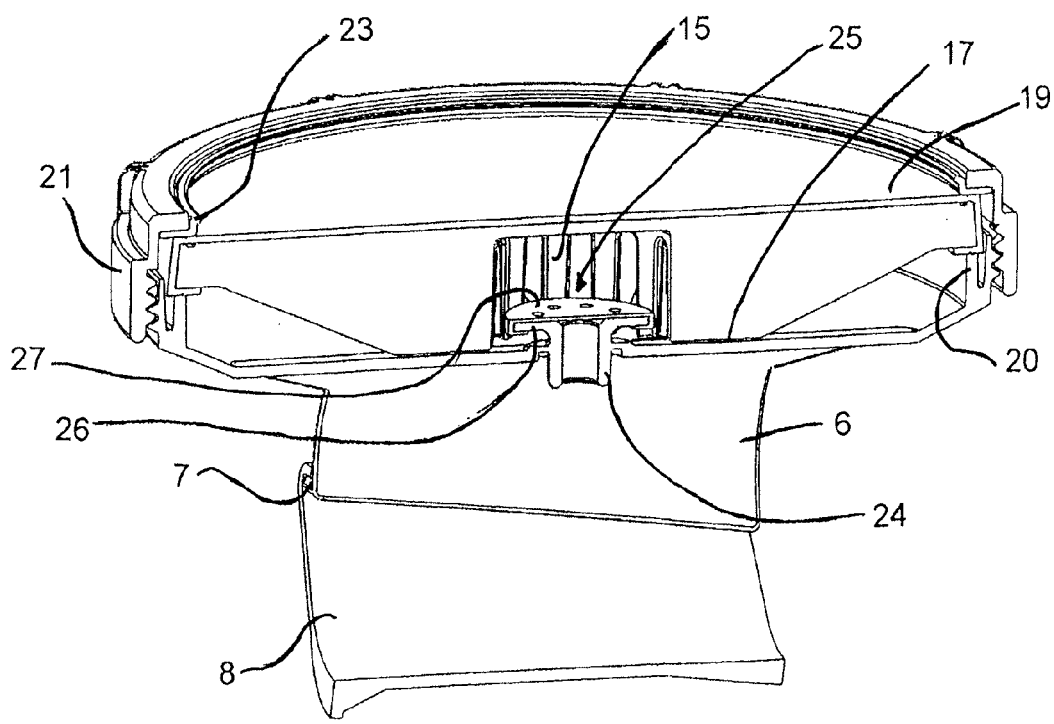
FIG. 3 shows a further perspective sectional view according to FIG. 2.

In the FIGS. 1 to 3, a lower housing element 1 advantageously made of injection-molded plastic has a cylindrical first peripheral wall 2 with an external thread 3 formed thereon. A funnel-shaped bottom section 4, which is penetrated by a curved bottom section 5, extends from the first peripheral wall 2. The curved bottom section 5 is integral part of a connecting piece 6 which is molded onto the bottom and is configured in the manner of a half-cylinder.

As is in particular shown in FIG. 2, the connecting piece 6 has two outwardly extending webs 7 which run obliquely with regard to an axis of the connecting piece 6. A counter piece, designated with the reference number 8, is configured in the manner of an expanding half-cylinder and has a groove-like recess 9 on both of its edges. The groove-like recess 9 is formed so as to correspond to the webs 7 so that the counter piece 8 can be connected to the connecting piece 6 by sliding it thereon.

An upper housing element 10, advantageously made of injection molded plastic, is constructed in the manner of a disc and has a cylindrical second peripheral wall 11. An outer diameter of the second peripheral wall 11 is smaller than an inner diameter of the first peripheral wall 2 so that the upper housing element 10 can be inserted into the lower housing element 1. An upper side O of the upper housing element 10 is formed to be substantially flat. Adjacent to the second peripheral wall 11, a carrier disc 12 forming the upper side O has slot-like gas through-openings 13.

Figure 4:
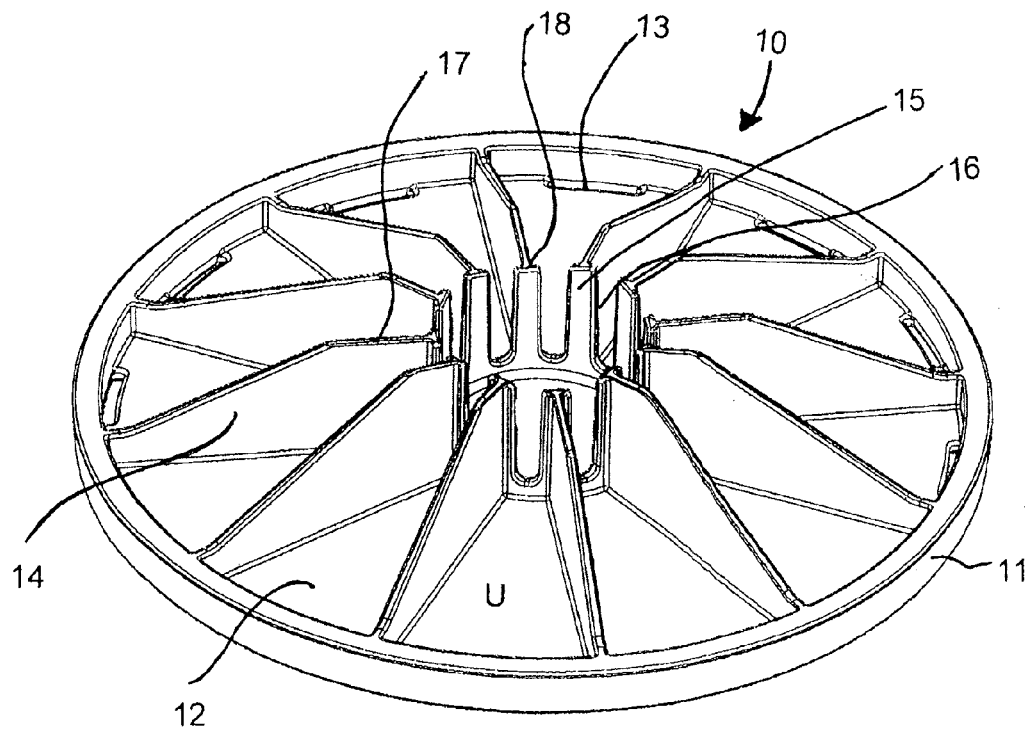
FIG. 4 shows a perspective bottom view of the upper housing element.
Figure 5:
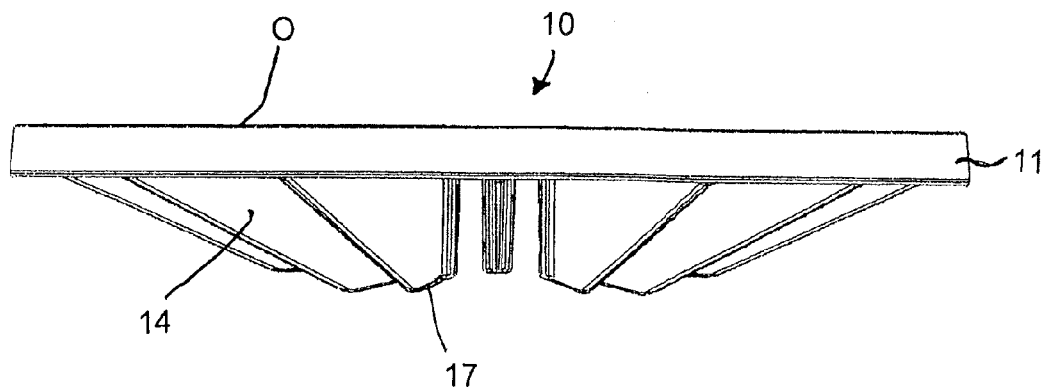
FIG. 5 shows a side view according to FIG. 4.

As is in particular shown in the FIGS. 4 and 5, reinforcement webs or ribs 14 extend from the second peripheral wall 11 in the radial direction on a lower side U of the carrier disc 12.

A height of the ribs 14 molded on the carrier disc 12 increases in sections from a peripheral edge, formed by the second peripheral wall 11, of the upper housing element 10 toward the center of the latter. The center of the lower side U is surrounded by a cylindrical support structure 15 which extends from the carrier disc 12. The ribs 14 adjoin the cylindrical support structure 15. The cylindrical support structure 15 has a multiplicity of axial slots 16 which extend between the ribs 14 up into the vicinity of the carrier disc 12.

At least a portion of the ribs 14 has in each case a support edge 17 in the vicinity of the cylindrical support structure 15. Height and inclination of the support edge 17 are adapted in such a manner that in the assembled state, at least a portion of the ribs 14 is supported on the curved bottom section 5. In a similar manner, upper edges 18, also shaped in the form of circular arc sections, of the cylindrical support structure 15 are also formed such that, in the assembled state, they are positively supported on the curved bottom section 5.

Although not shown in the figures, it is also possible that the support edges 17 of the ribs 14 are configured in such a manner that they can be supported in two installation positions, for example differing by 90°, in each case on the curved bottom section 5.

Reference number 19 designates a gassing membrane which is made, for example, from silicone rubber and which is configured so as to correspond to the upper side O and the second peripheral wall 11. A circumferential edge section of the gassing membrane 19 embraces in the assembled state the second peripheral wall 11 in such a manner that the upper housing element 10 inserted into the lower housing element 1 is supported via the edge section of the gassing membrane 19 on a support web 20 molded onto the lower housing element 1. Through this, a gas-tight sealing of a housing formed by the upper 10 and the lower housing element 1 is achieved.

For fastening the upper housing element 10 together with the gassing membrane 19 attached thereto, a threaded ring 21 is provided, the inner wall of which has an internal thread 22 that corresponds to the external thread 3. An intermediate ring 23 applies a clamping force exerted by the threaded ring 21 uniformly to the gassing membrane 19 and forms at the same time a sliding surface when tightening the threaded ring 21.

The curved bottom section 5 of the lower housing element 1 is penetrated by a gas inlet port 24, wherein on the inlet port's one end facing the housing interior, a one-way membrane 25 having a membrane plate 26 and a perforated valve membrane 27 attached thereto is provided.

The function of the device is the following:

For assembling on a gas supply line (not shown in the figures) provided with a gas supply opening, the pre-assembled device with the connecting piece 6 is placed onto the gas supply line in such a manner that the gas inlet port 24 penetrates through the gas supply opening (not shown here). Subsequently, the counter piece 8 is attached onto the connecting piece 6 and the device is thereby clampingly fastened to the gas supply line.

The air fed under pressure through the gas supply line flows through the gas inlet port 24 and the one-way membrane valve 25 and arrives in the cylindrical support structure 15, and from there through the axial slots 16 in a gas supply chamber formed between the ribs 14. From there, the fed air is pressed through the gas through-openings 13 and against the perforated gassing membrane 19. The air penetrates the perforations provided in the gassing membrane 19 and penetrates in the form of fine bubbles into a liquid surrounding the device.

By pressing the air through the gas through-openings 13 arranged radially outward in the carrier plate 12 and against the gassing membrane 19, the gassing membrane 19 inflates starting from the peripheral edge over the full area. The entire area of the gassing membrane 19 is utilized for generating gas bubbles.

A liquid pressure acting during interrupted gas supply on the upper housing element 10 is applied via the cylindrical support structure 15 and the ribs 14 with the support edges 17 provided thereon in particular against the curved section 5 of the bottom of the lower housing element 1.

REFERENCE LIST

1 lower housing element
2 first peripheral wall
3 external thread
4 funnel-shaped bottom section
5 curved bottom section
6 connecting piece
7 web
8 counter piece
9 groove-like recess
10 upper housing element
11 second peripheral wall
12 carrier disc
13 gas through-opening
14 rib
15 cylindrical support structure
16 axial slot
17 support edge
18 upper edge
19 gassing membrane
20 support web
21 threaded ring
22 internal thread
23 intermediate ring
24 gas inlet port
25 one-way membrane valve
26 membrane plate
27 valve membrane
O upper side
U lower side

The invention claimed is:

1. A device for gassing liquids, comprising:
 a lower housing element which has
  a substantially round opening area, and
  a gas inlet port arranged centrally in the lower housing element,
 a disk-shaped upper housing element, which corresponds to the substantially round opening area, for covering the substantially round opening area, wherein the disk-shaped upper housing element has a disk-shaped carrier plate having an upper side which faces away from the lower housing element and which is formed to be substantially flat, and a plurality of gas through-openings is provided in a vicinity of a peripheral edge of the disk-shaped upper housing element, said vicinity being at least 0.7-fold of a radius of the upper housing element, said gas through-openings passing through the disk-shaped carrier plate arranged along a full circle radially outward in the disk-shaped carrier plate, and
 a perforated gassing membrane having a disk-shaped area, covering the upper side of the disk-shaped upper housing element, fastened to a periphery of the upper housing element, so that gas is pressed through the gas through-openings arranged radially outward in the disk-shaped carrier plate and is pressed against the perforated gassing membrane, whereby the perforated gassing membrane inflates starting from the peripheral edge over an entire area and provides gas bubbles escaping all over an entire the disk-shaped area of the gassing membrane.

2. The device according to claim 1, wherein the bottom has a curved section with a curvature that corresponds to the fillet and protrudes toward the substantially round opening area.

3. The device according to claim 1, wherein the gas inlet port passes centrally through the bottom.

4. The device according to claim 1, wherein the gas inlet port passes through the connecting piece.

5. The device according to claim 1, further comprising an opening of the gas inlet port with a one-way valve,
 wherein the opening faces a housing interior of the lower housing element.

6. The device according to claim 5, wherein the one-way valve is a one-way membrane valve.

7. The device according to claim 1, further comprising a cylindrical support structure extending from a lower side of the disk-shaped upper housing element,
 wherein the lower side opposes the upper side of the disk-shaped upper housing element.

8. The device according to claim 7, wherein the cylindrical support structure is supported on a curved section of the bottom of the lower housing element when the disk-shaped upper housing element is attached on the lower housing element.

9. The device according to claim 7, further comprising ribs extending radially from the cylindrical support structure toward the peripheral edge,
 wherein one of said gas through-openings is provided between two of the ribs adjacent to each other.

10. The device according to claim 7, wherein the cylindrical support structure comprises a plurality of apertures in a form of axially extending slots.

11. The device according to claim 9, wherein the ribs are positively supported in sections on a curved section of the bottom of the lower housing element when the disk-shaped upper housing element is attached on the lower housing element.

12. The device according to claim 9, wherein, when the disk-shaped upper housing element is attached on the lower housing element, the ribs are positively supported on a curved section of the bottom of the lower housing element in two directions which are perpendicular to each other.

13. The device according to claim 1, further comprising a threaded ring engaging over the peripheral edge of the disk-shaped upper housing element for fastening the disk-shaped upper housing element to the lower housing element.

14. The device according to claim 1, wherein the lower housing element further has a bottom in a funnel-like shape at at least a part of the bottom, a connecting piece in a semi-cylindrical shape, molded in a manner of fillet to attach the lower housing element to a gas supply line, and having protrusions projecting outwardly at two edges of the connecting piece, and a counter piece in a chute shape, having groove-like recesses opposing to each other, interlocked with the connecting piece at edges of the counter piece.

15. The device according to claim 14, wherein the protrusions and the groove-like recesses corresponding thereto are arranged obliquely.

16. The device according to claim 14, wherein the protrusions and the groove-like recesses are interlocked with each other.

* * * * *